United States Patent [19]

Erdmannsdoerfer et al.

[11] Patent Number: 5,693,217

[45] Date of Patent: Dec. 2, 1997

[54] FLUID CIRCUIT WITH A PRIMARY STREAM FILTER AND A BYPASS STREAM CENTRIFUGE

[75] Inventors: Hans Erdmannsdoerfer, Dobel; Martin Schetter, Besigheim; Martin Weindorf, Kornwestheim, all of Germany

[73] Assignee: Filterwerk Mann & Hummel GmbH, Ludwigsburg, Germany

[21] Appl. No.: 520,931

[22] Filed: Aug. 30, 1995

[30] Foreign Application Priority Data

Aug. 30, 1994 [DE] Germany .................. 44 30 751.9

[51] Int. Cl.$^6$ .................. B01D 17/12; F01M 11/02
[52] U.S. Cl. .................. 210/97; 210/117; 210/130; 210/136; 210/168; 210/297; 210/348; 210/360.1; 184/624; 137/625.29
[58] Field of Search ............... 210/97, 117, 130, 210/136, 168, 232, 297, 304, 360.1; 137/625, 625.29, 625.5; 184/6.24

[56] References Cited

U.S. PATENT DOCUMENTS 2,796,075  6/1957  Focht .
3,683,961  8/1972  Launnay et al. .......... 137/625.5
3,933,638  1/1976  Isley ........................ 210/168
4,032,447  6/1977  Douglass .................. 210/168

FOREIGN PATENT DOCUMENTS 1166155  3/1964  Germany .
3742455  6/1989  Germany .
606578   7/1994  Germany .
735658   8/1955  United Kingdom .

OTHER PUBLICATIONS

Spinner II—Oil Cleaning Centrifuge, Brochure, 1985.

Primary Examiner—David A. Reifsnyder
Attorney, Agent, or Firm—Evenson, McKeown, Edwards & Lenahan P.L.L.C.

[57] ABSTRACT

A hydraulic fluid circuit having a primary stream filter and a centrifuge disposed on a bypass, in which a device for setting a minimum response pressure for operation of the centrifuge and for maintaining an overall maximum pressure in the fluid circuit is arranged between primary stream filter and the centrifuge.

18 Claims, 5 Drawing Sheets

FLUID CIRCUIT WITH A PRIMARY STREAM FILTER AND A BYPASS STREAM CENTRIFUGE

BACKGROUND OF THE INVENTION

This invention relates to a hydraulic fluid circuit with a primary stream filter and with a centrifuge disposed in particular in a secondary stream.

Such devices are known in internal combustion engines, especially for supplying the engine with cleaned lubricating oil.

The lubricating oil circuit in an internal combustion engine commonly comprises the following components: an oil pump, a pressure reducing or pressure control valve, an oil cooler, a primary stream filter with a bypass valve, a plurality of points to be lubricated, and an oil supply in a motor oil pan. The pressure reducing valve serves to assure that the pressure in the oil circuit, which increases linearly with the engine speed and is due to the rate of output of the oil pump, which also increases linearly, is cut off at, or limited to, about 4 to 5 bar. The pump power needed is thereby simultaneously limited.

It is a disadvantage of such devices that the cleaning of the oil often does not satisfy the requirements. In order to increase the cleaning, it would be possible to increase the filter area and/or to increase the filter depth, but this would contribute to an increase in the pressure loss across the filter, and this would be undesirable technically, since then the pump capacity then would have to be increased.

SUMMARY OF THE INVENTION

It is therefore the object of the invention to provide an improved device of the foregoing type.

Another object of the invention is to provide a device of this type which is simple, cost effective and reliable.

These and other objects of the invention have been achieved in accordance with the present invention by providing a hydraulic fluid circuit comprising a primary stream, a pump for pumping hydraulic fluid through the circuit, a filter disposed of the primary stream, a bypass line which is connected to the primary stream and which avoids the filter, a centrifuge disposed on the bypass line, and a pressure regulator arranged between the filter and the centrifuge for setting a minimum response pressure for the centrifuge and for maintaining a maximum pressure in the fluid circuit.

The invention thus comprises a device arranged between the primary stream filter and the centrifuge for reducing and/or setting the minimum fluid pressure.

One advantageous embodiment of the invention provides that the pressure reduction and the setting of the minimum pressure are achieved by means of a valve. This saves space and costs.

Furthermore, in accordance with one advantageous embodiment the valve comprises at least two offset bores. An additional bore vents the valve which opens into a pressureless (unpressurized) chamber.

In accordance with another advantageous embodiment the valve is arranged with a first bore connected by a fluid duct to the centrifuge axis.

If desired, a second bore can advantageously be connected by a return passage, preferably the centrifuge outlet, to the liquid pan (oil pan), the return passage advantageously being arranged in the centrifuge housing.

One advantageous embodiment provides for the valve to be disposed following the primary stream filter; this forestalls functional problems which may be caused by contaminants in the oil. The pressure loss caused by sludge does not have to be compensated by a higher pressure level.

Furthermore, it can be advantageously provided that the valve is advantageously disposed ahead of the primary stream filter; this mainly saves space.

One advantageous embodiment provides for a nozzle in the centrifuge to be constructed as a hollow rivet. This guards against flow losses due to burrs on punched holes and is comparatively inexpensive.

Furthermore, it is advantageously possible to make the centrifuge shaft from a tube inserted into the housing with a predominantly elastomeric sealing plug and/or a predominantly elastomeric ring; this eliminates the otherwise customary threads on the shaft, and by using tubing material also eliminates an additional production step, namely the boring of the oil inlet.

In accordance with another advantageous embodiment, the centrifuge rotor, which consists of a cylindrical vessel and a cover crimped to each other, is arranged with the crimp at the end opposite the nozzle bottom. Thus, the diameter over which the nozzle holes are arranged is not limited by the annular space that must be kept free for the crimp backing tool. The nozzles therefore have a lever arm that is about 25% long with respect to the outside diameter and the field of application, e.g., in the passenger car field, and thus produce a correspondingly greater torque and greater rotational speeds, which results in better degrees of separation.

In accordance with one advantageous embodiment, the shaft, which itself is loose, is fastened with a lock ring. Consequently the mounting can be created almost entirely in the inside tube, since the inside tube is not crimped in the cover. This has the advantage that dirt and chips, which are formed by the reaming of the bearing and which are practically impossible to flush out in the manufacture of the finished tube, cannot be delivered with the centrifuge as base contamination. At the same time the elimination of crimping makes this more cost-effective and better with regard to dimensional accuracy than the crimped variety. Accordingly it is possible to provide a lock ring at the upper end, at the lower end, or at both ends.

In one advantageous embodiment, a hollow body, formed in particular of plastic (i.e. synthetic resin) material, is utilized in the centrifuge rotor. The dirt that is deposited as a viscous, sticky annular layer can thus be removed from the rotor. The caked dirt deposits in this hollow body and, after the rotor is opened, can be disposed of together with the plastic hollow body.

In one advantageous embodiment, the centrifuge rotor can be opened by means of a closure or latch mechanism and is provided with a hollow plastic body in the interior.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to representative preferred embodiments illustrated in the accompanying drawings in which.

DETAILED DESCRIPTION OF THE PREFERRED EMBODIMENTS

Figure 1:
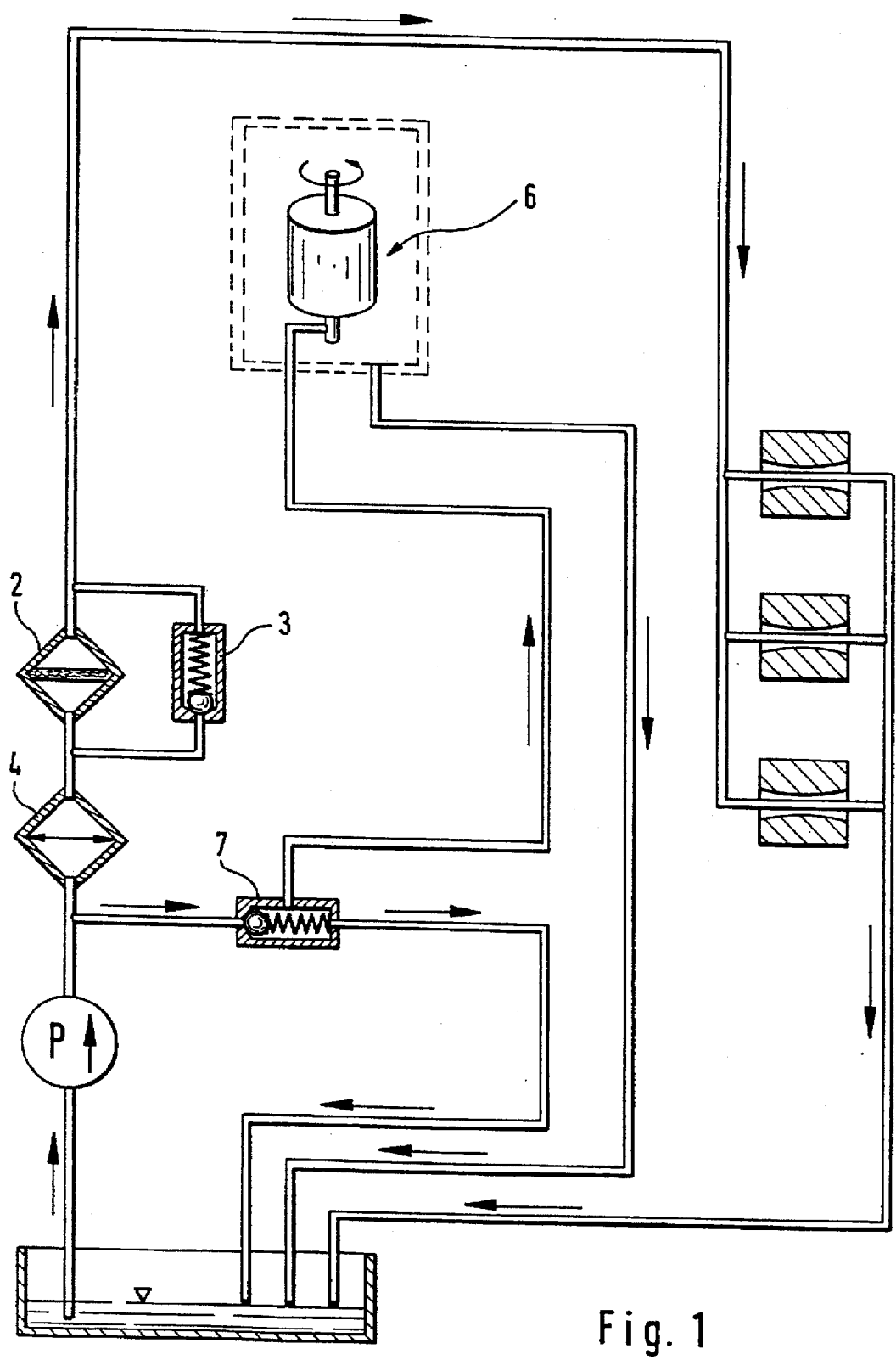
FIG. 1 shows a lubrication circuit with a centrifuge on a bypass line and a combined minimum pressure and pressure regulating valve on the unfiltered oil side.

The filter circuit illustrated in FIG. 1 comprises a housing 1, a primary stream filter 2 with bypass valve 3, an oil cooler 4, a centrifuge 6 mounted on an upright tubular shaft 5 in the bypass, as well as the combined, two stage, minimum pressure and pressure reducing valve 7 which is arranged on the unfiltered oil side of the filter 2.

Figure 2:
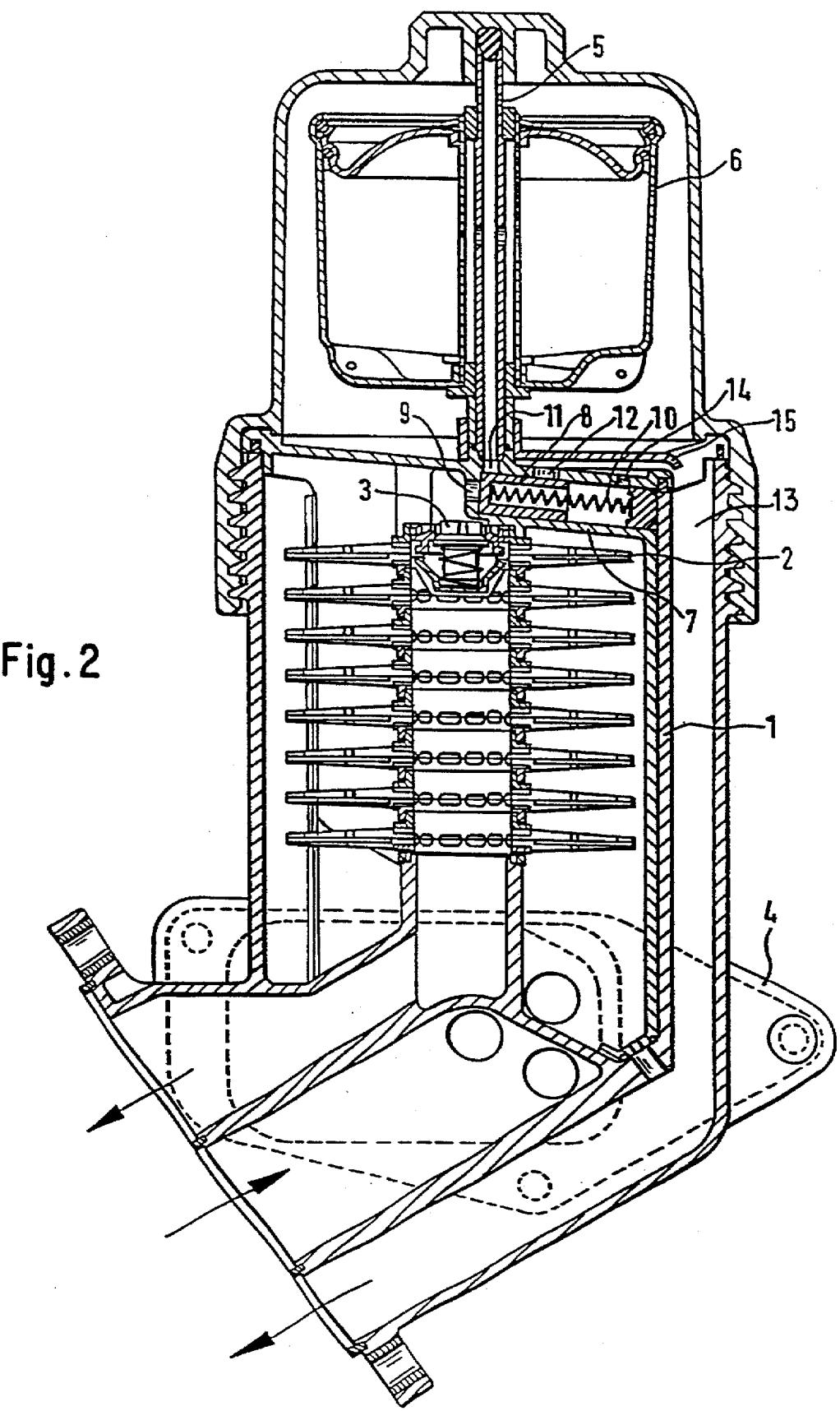
FIG. 2 is a sectional view of the lubrication circuit of FIG. 1.

As can be seen in FIG. 2, the piston 8 of the two stage pressure regulator valve 7 is acted upon by oil under pressure through bore 9. A compression spring 10 opposes the developing pressure force. At the spring end the valve is vented through a bore 14. At a pressure of, for example, about 1.5 to 2 bar, depending on the design of the system, the piston is displaced to such a distance that it opens the oil bore 11 leading to the hollow centrifuge shaft 5 and thus to the centrifuge. The pressure continues to increase with increasing engine speed. At a pressure of, for example, about 5 bar the piston opens another transverse bore 12 into the unpressurized discharge cross section 13 of the centrifuge. Thus the maximum oil pressure is limited. When valve 7 goes to the pressure reducing position and bore 12 is opened, the additionally pumped stream flows through the unpressurized outlet cross section 13 of the centrifuge 6. A cover 15 directs the oil stream directly into the outlet cross section. This arrangement replaces two separate valves commonly used in conventional systems with a two-stage valve.

Figure 3:
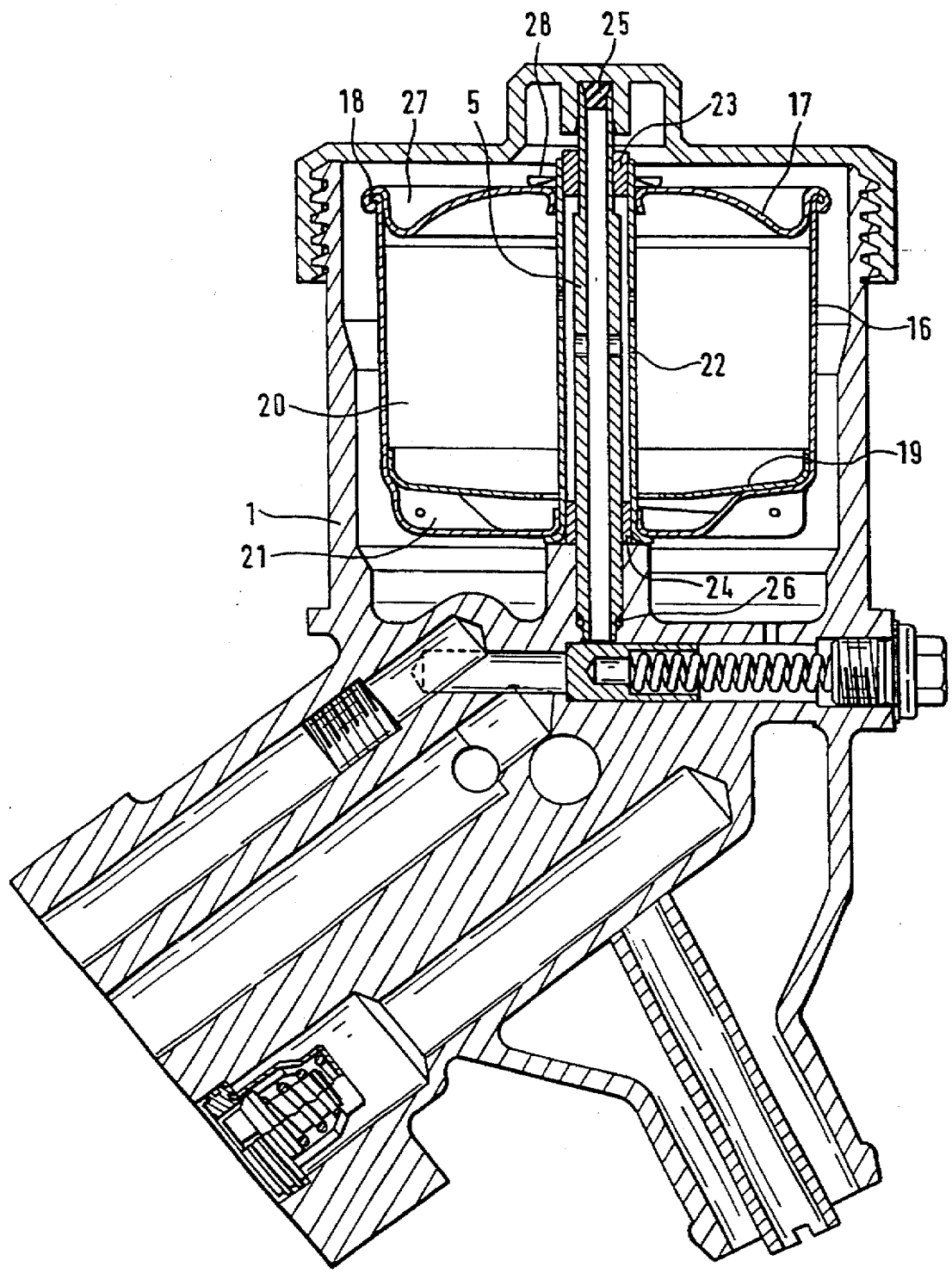
FIG. 3 is a sectional view of a centrifuge rotor and its mounting.

As seen more clearly in FIG. 3, the centrifuge rotor situated in the centrifuge comprises a cylindrical vessel 16 with cover 17. These parts are held together by a crimp 18. An intermediate bottom 19 separates the dirt chamber 20 from the oil and nozzle chamber 21. An interior tube 22 contains two aligned antifriction bearings 23 and 24 with which the rotor is mounted on the shaft 5.

The tubular shaft 5 is simply inserted in the cylindrical housing 34 and simultaneously mounted at both ends for low vibration and sealed with an elastomer plug 25 and an elastomer ring 26. In an alternate embodiment, the tubular shaft 5 can be mounted at both ends in elastomer rings 26.

The crimp 18 is positioned at the opposite end of the centrifuge from the nozzle bottom. Thus, the diameter on which the nozzle bores are disposed is not limited by the annular space 27 which must be kept free for the crimper. Thus, compared to conventional motor vehicle dimensions and outer diameters, the nozzles have a lever arm that is about 25% greater and thus produce a correspondingly greater torque and higher rotational speeds, which results in better separating action.

The interior tube 22 in the cylindrical vessel 16 of the centrifuge rotor is, for example, not crimped at one end to the cover 17, but is held by a lock ring 28.

Figure 4:
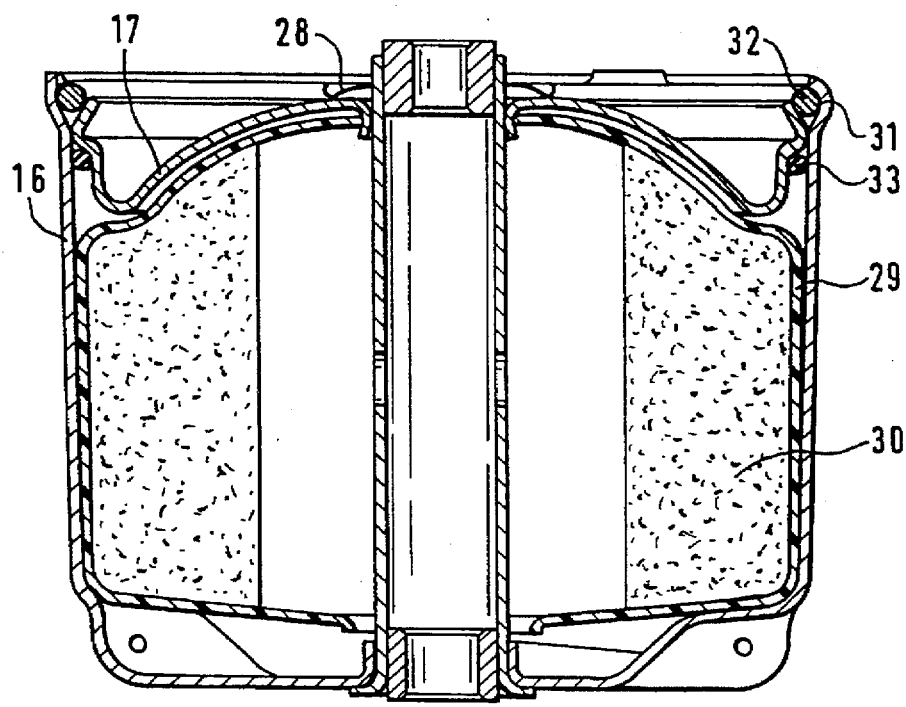
FIG. 4 shows a centrifuge rotor with hollow body inserted therein.
Figure 5A:
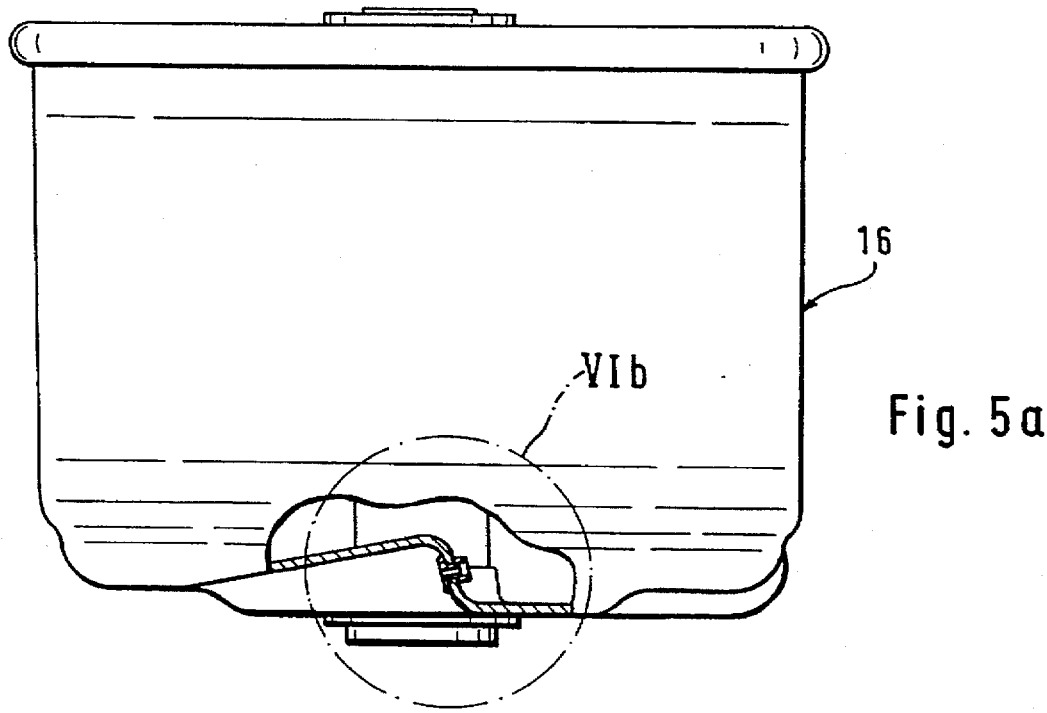
FIGS. 5a, 5b and 6a, 6b show variant nozzles.
Figure 5B:
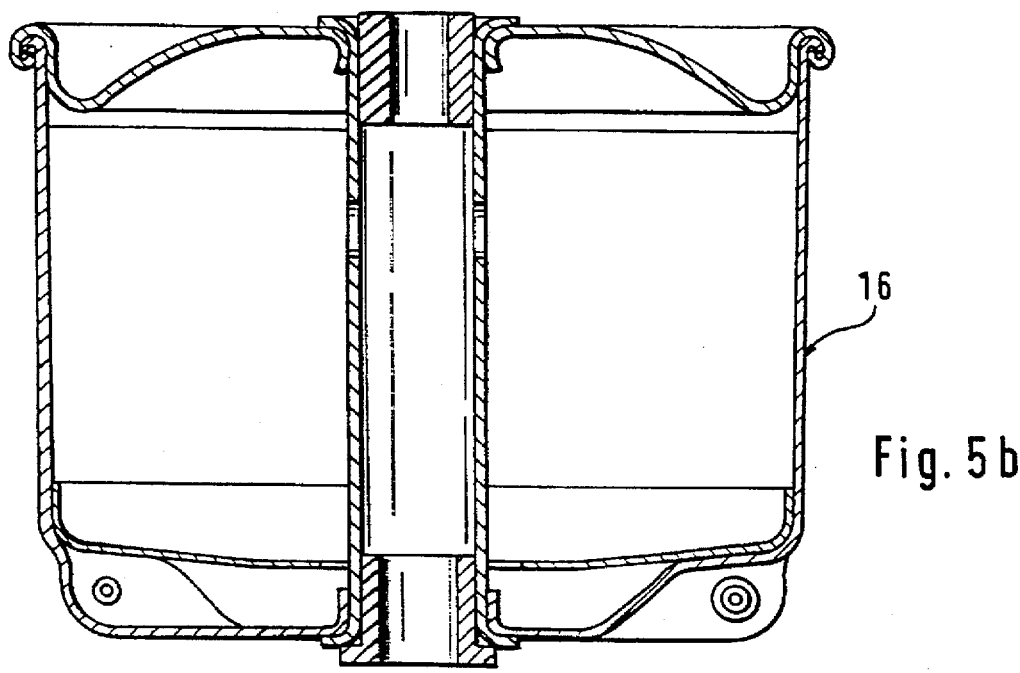
Figure 6A:
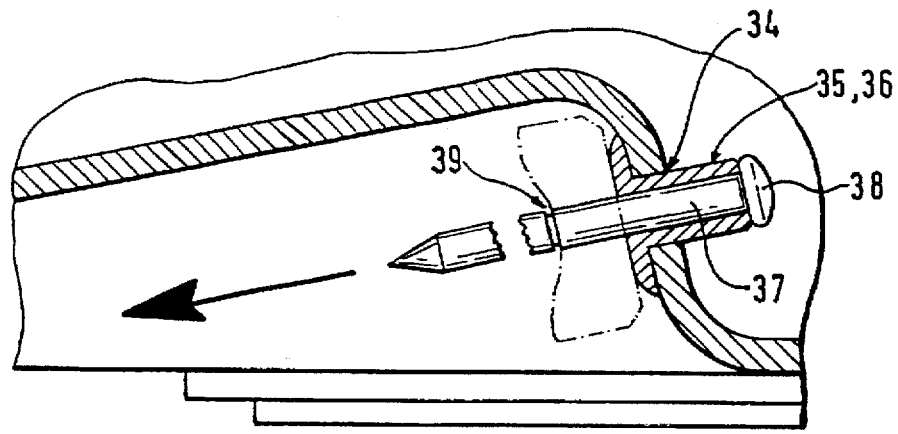
Figure 6B:
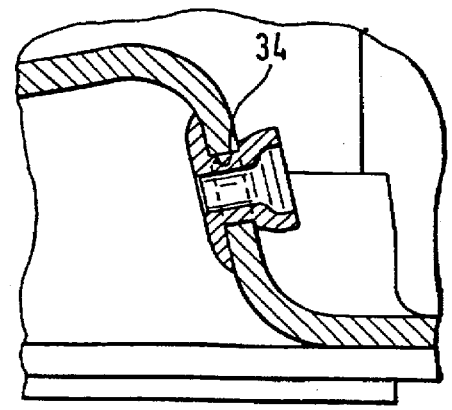

In an alternate embodiment of the centrifuge rotor shown in FIG. 4, the dirt that is deposited as a viscous, sticky layer can be removed from the rotor. For this purpose, instead of the intermediate sheet metal bottom 19, a hollow body of plastic 29 is used, which can be manufactured conventionally in two parts or in one piece by blow molding. The dirt layer 30 deposits itself in this hollow body 29, and after the rotor is opened by removing the cover 17, the deposited dirt 30 can be removed together with the plastic part 29.

For this purpose the rotor is constructed so that it can be opened. Cylindrical vessel 16 and cover 17 are not crimped to each other. Instead, the cover is held against the internal pressure in the cylindrical vessel by a round wire ring 32 inserted in a bead 31. This ring 32 is removable, so that the cover 17 can also be removed after breaking the lock ring 28. An O-ring 33 seals the oil chamber in at the joint between the cylindrical vessel 16 and the cover 17.

The propulsion nozzles on the centrifuge rotor, and their configuration, are important to the efficiency of the centrifuge. For cost reasons the design of the nozzle openings in the sheet-metal centrifuge rotor must be very simple. The openings are therefore preferably punched from the outside. If they are made free of burrs a velocity factor $\phi$ of approximately 0.96 and correspondingly higher propulsion forces are achieved. If punching does produce burrs internally at the openings, $\phi$ is reduced to levels of approximately 0.7.

As a remedy in this case a so-called "pop rivet" 35 is inserted as a nozzle into a punched opening 34 in the centrifuge cylindrical vessel 16. As usual in this technique, the undeformed rivet 36 is placed on a pin 37. Its outside diameter corresponds to the specified inside diameter of the finished nozzle. After the rivet-on-pin combination is inserted into the punched hole in the centrifuge cylindrical vessel, the inside rivet head is shaped by pulling the pin with a tool through the pin head 38. If this pin head is of the appropriate configuration the result will be a good entry geometry for the nozzle. When the inside rivet head is shaped, the tension on the notch in the pin increases to such an extent that the pin breaks off at the indentation 39. Then the part remaining in the finished nozzle is driven inwardly by the assembly device. A nozzle formed in this way can attain a velocity factor $\phi$ of approximately 0.98.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hydraulic fluid circuit comprising a primary stream, a pump for pumping hydraulic fluid through said circuit, a filter disposed on said primary stream, a bypass line which is connected to said primary stream and which avoids said filter, a centrifuge disposed on the bypass line, and a pressure regulator comprising a two stage valve arranged between the filter and the centrifuge for opening the bypass line when a minimum response pressure for the centrifuge is attained in the fluid circuit, and for maintaining a maximum pressure in the fluid circuit, wherein said centrifuge comprises a rotor comprising a cylindrical vessel with at least one propulsion nozzle through which fluid exits the vessel to drive the rotor.

2. A hydraulic fluid circuit according to claim 1, wherein said valve comprises at least two offset bores.

3. A hydraulic fluid circuit according to claim 2, wherein said valve comprises a venting bore which opens into an unpressurized fluid chamber.

4. A hydraulic fluid circuit according to claim 1, wherein said valve is arranged with a first outlet bore connected via a fluid passage to a center shaft of said centrifuge.

5. A hydraulic fluid circuit according to claim 1, wherein said pressure regulator is arranged upstream of said filter.

6. A hydraulic fluid circuit according to claim 1, wherein the centrifuge comprises a rotor body with an interior tube fastened at one end to the rotor body and secured at its other end by an axial lock member.

7. A hydraulic fluid circuit according to claim 6, wherein said axial lock member is a lock ring secured to a smooth outer surface of said interior tube.

8. A hydraulic fluid circuit according to claim 1, wherein the centrifuge comprises a rotor body with an interior tube fastened at both ends to the rotor body by axial lock members.

9. A hydraulic fluid circuit according to claim 1, wherein said centrifuge comprises a tubular shaft secured inside a cylindrical housing by a pair of elastomeric members.

10. A hydraulic fluid circuit according to claim 9, wherein said elastomeric members comprise an elastomeric plug and an elastomeric ring.

11. A hydraulic fluid circuit according to claim 1, wherein said rotor comprises a cylindrical vessel and a lid crimped to one axial end thereof, and said propulsion nozzles are formed at an opposite axial end thereof from the crimped lid.

12. A hydraulic fluid circuit according to claim 1, wherein said centrifuge turns on an upright tubular shaft mounted in a centrifuge housing by means of a lock member.

13. A hydraulic fluid circuit comprising a primary stream, a pump for pumping hydraulic fluid through said circuit, a filter disposed on said primary stream, a bypass line which is connected to said primary stream and which avoids said filter, a centrifuge disposed on the bypass line, and a pressure regulator arranged between the filter and the centrifuge for opening the bypass line when a minimum response pressure for the centrifuge is attained in the fluid circuit and for maintaining a maximum pressure in the fluid circuit, wherein said pressure regulator comprises a two stage valve arranged with a first outlet bore connected via a fluid passage to a center shaft of said centrifuge and a second outlet bore connected via a fluid return passage to a fluid reservoir.

14. A hydraulic fluid circuit according to claim 13, wherein said fluid return passage is an outlet passage for the centrifuge.

15. A hydraulic fluid circuit comprising a primary stream, a pump for pumping hydraulic fluid through said circuit, a filter disposed on said primary stream, a bypass line which is connected to said primary stream and which avoids said filter, a centrifuge disposed on the bypass line, and a pressure regulator arranged between the filter and the centrifuge for opening the bypass line when a minimum response pressure for the centrifuge is attained in the fluid circuit, and for maintaining a maximum pressure in the fluid circuit, wherein said centrifuge comprises a rotor comprising a cylindrical vessel with at least one propulsion nozzle through which fluid exits the vessel to drive the rotor, and wherein each said at least one propulsion nozzle is formed by a hollow rivet.

16. A hydraulic fluid circuit comprising a primary stream, a pump for pumping hydraulic fluid through said circuit, a filter disposed on said primary stream, a bypass line which is connected to said primary stream and which avoids said filter, a centrifuge disposed on the bypass line, and a pressure regulator arranged between the filter and the centrifuge for opening the bypass line when a minimum response pressure for the centrifuge is attained in the fluid circuit and for maintaining a maximum pressure in the fluid circuit, wherein said centrifuge comprises a rotor containing a removable hollow plastic body disposed interiorly of the rotor for collecting contaminants separated from the hydraulic fluid by the centrifuge.

17. A hydraulic fluid circuit according to claim 16, wherein said hollow plastic body forms an intermediate bottom partition in said centrifuge.

18. A hydraulic fluid circuit according to claim 16, wherein the centrifuge rotor comprises a closure mechanism for selectively opening the centrifuge rotor, and said hollow plastic body is removable and exchangeable to empty the rotor of collected contaminants.

* * * * *